(12) United States Patent
Shimaguchi

(10) Patent No.: US 6,843,147 B2
(45) Date of Patent: Jan. 18, 2005

(54) AUTOMATIC TRANSMISSION

(75) Inventor: Hiromichi Shimaguchi, Shizuoka-ken (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 0 days.

(21) Appl. No.: 10/400,004

(22) Filed: Mar. 26, 2003

(65) Prior Publication Data

US 2003/0183028 A1 Oct. 2, 2003

(30) Foreign Application Priority Data

Mar. 27, 2002 (JP) ........................................ 2002-088408

(51) Int. Cl.⁷ .............................................. F16H 61/04
(52) U.S. Cl. ...................................................... 74/339
(58) Field of Search ................................. 74/339, 333

(56) References Cited

U.S. PATENT DOCUMENTS

| | | | |
|---|---|---|---|
| 4,576,063 A | * 3/1986 | Akashi et al. | 74/331 |
| 4,594,908 A | * 6/1986 | Akashi et al. | 74/331 |
| 6,044,719 A | 4/2000 | Reed, Jr. et al. | |
| 6,494,110 B2 | 12/2002 | Hatakeyama | |
| 6,546,830 B2 | * 4/2003 | Kanazawa | 74/333 |
| 6,561,052 B2 | * 5/2003 | Kayano et al. | 74/339 |
| 6,647,817 B2 | * 11/2003 | Kobayashi | 74/333 |
| 6,732,601 B2 | * 5/2004 | Suzuki | 74/336 R |
| 2001/0013258 A1 | 8/2001 | Kobayashi | 74/359 |

FOREIGN PATENT DOCUMENTS

| | | |
|---|---|---|
| JP | 05-248527 | 9/1993 |
| JP | 05-96617 U | 12/1993 |
| JP | 06-201027 | 7/1994 |
| JP | 2703169 B2 | 10/1997 |
| JP | 3011567 B2 | 12/1999 |
| JP | 2000-097297 | 4/2000 |
| JP | 2001-227599 | 8/2001 |
| JP | 2001-227600 | 8/2001 |
| JP | 2001-280495 | 10/2001 |
| JP | 2001-289288 | 10/2001 |

* cited by examiner

*Primary Examiner*—Sherry Estremsky
(74) *Attorney, Agent, or Firm*—Flynn, Thiel, Boutell & Tanis, P.C.

(57) ABSTRACT

An automatic transmission having change gears which include a first path to directly transmit torque of an input shaft to an output shaft, and a second path to transmit the torque through an intermediate shaft on a driving force path from the input shaft to the output shaft. The first path includes at least one output gear on the output shaft which is engageable and disengageable by a shift sleeve. The output gear is connected at downstream thereof to the second path. The second path includes a first intermediate gear on the intermediate shaft to input the torque, a clutch, and a second intermediate gear rotatably supported through the clutch to output the torque. The output shaft includes a middle speed output gear to mesh with the second intermediate gear so as to form a middle-speed change gear.

4 Claims, 7 Drawing Sheets

AUTOMATIC TRANSMISSION

FIELD OF THE INVENTION

This invention relates to automatic transmissions, and more particularly to an automatic transmission which can be made small to easily mount on a vehicle.

BACKGROUND OF THE INVENTION

In vehicles, there are automatic transmissions to convert driving force of an engine according to a driving state of the vehicle, and power transmission devices including a transfer and others to transmit the driving power.

The automatic transmission includes one in which a normal gear-type manual transmission is automated to improve transmission efficiency of driving force with respect to the normal-type automatic transmission. The automatic transmission based on the gear-type manual transmission includes different speed-gears having a plurality of gear trains between input and output shafts, and a clutch to transmit driving force on a driving force path from the input shaft to the output shaft so as to change gears while the clutch is transmitting the driving force from the input shaft to the output shaft, thereby reducing disconnection of acceleration torque.

Such an automatic transmission is disclosed in, e.g., JP Laid-Open Nos. 2001-227599, 2001-289288, H06-201027, 2001-280495, and Japanese Utility Model Laid-Open No. H05-96617.

According to JP Laid-Open No. 2001-227599, in an automatic transmission based on the manual transmission, a plurality of mounting shafts including gears defining gear trains, is provided with an intermediate shaft at a position other than an axis line, and a sub clutch is disposed on the intermediate shaft to variably control transmitted torque during shifting gears.

According to JP Laid-Open No. 2001-289288, in an automatic transmission, a main shaft, a countershaft, and first and second sub shafts are disposed in parallel. The main shaft has a first gear thereon to transmit torque of the main shaft through a second passage to the countershaft. The second sub shaft has a third gear thereon to transmit the torque of the main shaft through a third passage to the countershaft. The first and third gears are disposed within a first plane extending perpendicularly to the shafts. The main shaft also has a second gear thereon to transmit the torque of the main shaft through a first passage to the countershaft. The second sub shaft also has a fourth gear thereon to transmit the torque of the main shaft through the third passage to the countershaft. The second and fourth gears are disposed within a second plane extending perpendicularly to the shafts.

According to JP Laid-Open No. H06-201027, an automatic transmission based on the manual transmission includes a damper clutch disposed at an end of an input shaft toward an engine, and a clutch having multi-plates disposed at the other end of the input shaft away from the engine. During shifting gears, variation in vehicle speed can be reduced by using the clutch having multi-plates, and the gears on the input and output shafts.

According to JP Laid-Open No. 2001-280495, a manual transmission has a parking gear on a countershaft outside of a transmission case so as to commonly use existing components of the transmission.

According to Japanese Utility Model Laid-Open No. H05-96617, in a transmission case of a gear transmission, a receiving section to receive lubricating oil is defined in or adjacent to an inner wall toward a portion where the lubricating oil is moved upwardly by gears. A return passage is formed adjacent to another wall that does not have the receiving section so as to downwardly return the lubricating oil received in the receiving section and to supply the oil to the section needed to be lubricated.

In the conventional automatic transmission, mounted on an FF (front engine, front drive) vehicle, in which the normal gear-type manual transmission is automated and a certain gear is engaged while using a hydraulic clutch, an additional hydraulic clutch and oil pump for cooling are equipped in order to reduce disconnection of acceleration torque during shifting gears. This increases the length, which is inconvenience when mounting on the vehicle. In addition, the additional oil pump complicates the constitution of the shafts. Forming a passage for cooling oil also complicates the constitution of the transmission case.

Furthermore, in JP Laid-Open No. H06-201027, positioning of the clutch at the other end of the input shaft away from the engine increases the length of the automatic transmission by the thickness of the clutch. It is difficult to mount the transmission on the vehicle due to interference with the vehicle frame when the engine and transmission are transversely mounted on the vehicle.

To obviate or minimize the above inconvenience, the present invention provides an automatic transmission having change gears including a plurality of gear trains between input and output shafts, and a clutch to transmit driving force on a driving force path between the input and output shafts, the gear trains being shifted while the clutch is transmitting the driving force of the input shaft to the output shaft. In this automatic transmission, the change gears include a first path to directly transmit torque of the input shaft to the output shaft, and a second path to transmit the torque through an intermediate shaft on the driving force path from the input shaft to the output shaft. The first path includes at least one output gear on the output shaft which is engageable and disengageable by a sleeve. The output gear is connected downstream thereof to the second path. The second path includes a first intermediate gear on the intermediate shaft to input the torque, the clutch, and a second intermediate gear rotatably supported through the clutch to output the torque. The output shaft includes a middle speed output gear to mesh with the second intermediate gear so as to form a middle-speed change gear.

According to the present invention, the middle speed gear train also serves as a gear train to drive the intermediate shaft having the clutch. The overall length of the automatic transmission can be reduced by the thickness of both the drive gear dedicated to drive the intermediate shaft and the clutch, so that the automatic transmission can be miniaturized. The interference with the vehicle frame can be eliminated when the engine and the automatic transmission are mounted to the FF (front engine, front drive) vehicle or are mounted transversely.

DETAILED DESCRIPTION

The present invention will now be described in specific detail with reference to Figures which illustrate a first embodiment of the invention.

Figure 1:
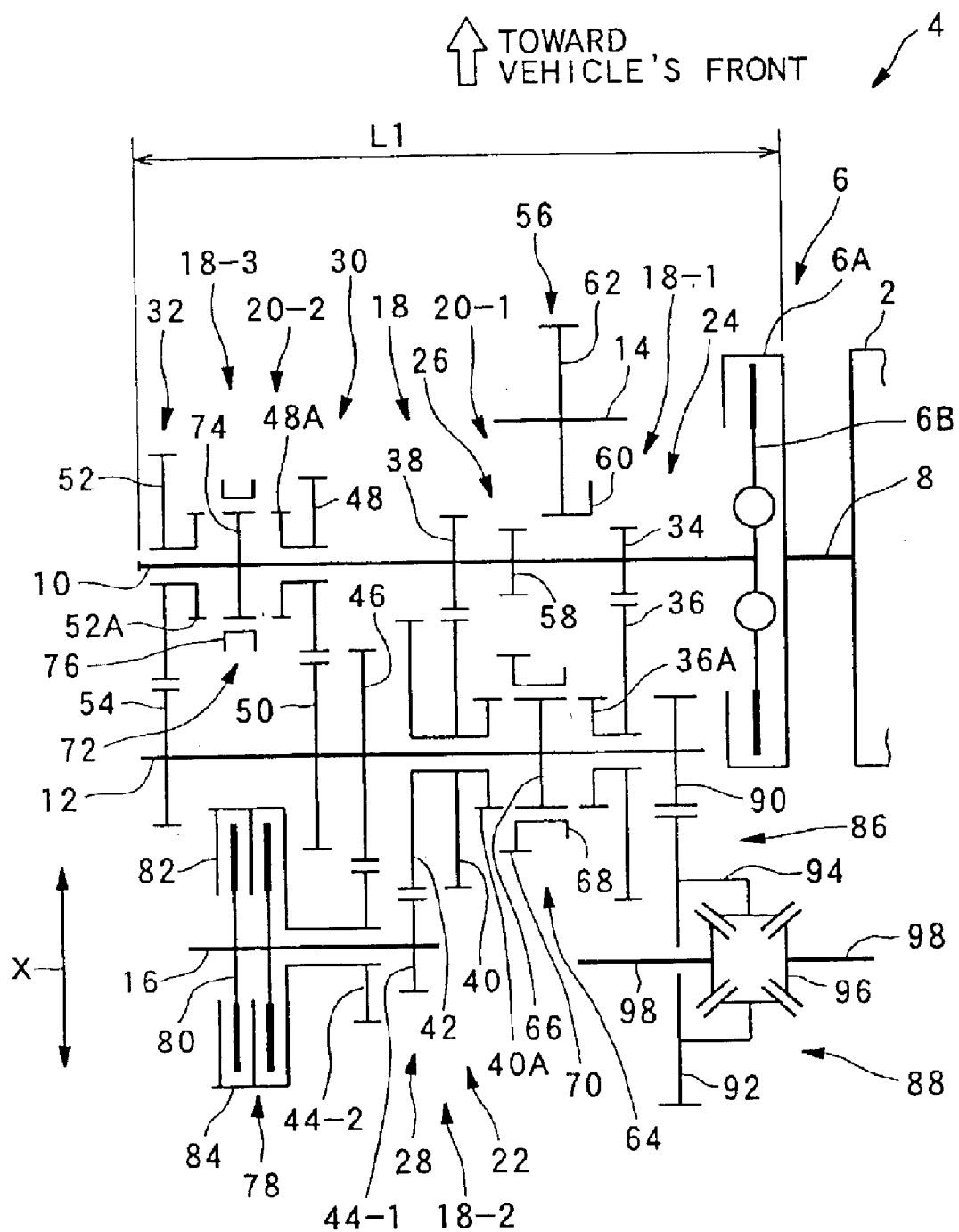
FIG. 1 is a diagram illustrating an automatic transmission according to a first embodiment of the invention.

In FIG. 1, reference numeral 2 designates an engine mounted on a vehicle, and 4 an automatic transmission connected to the engine 2 through a main clutch 6. The automatic transmission 4 is based on a normal gear-type manual transmission and includes change gears defined by a plurality of gear trains (five gear trains for forward and one for reverse). The change gears are automatically shifted. The main clutch 6 between the engine 2 and the automatic transmission 4 functions as a start and traveling clutch and is operated electronically. The main clutch 6 has an engage portion 6A fixed to a crank shaft 8 toward the engine 2, and an engage portion 6B toward the automatic transmission 4, which engage portions are connectable and disconnectable.

The automatic transmission 4 includes an input shaft (main shaft) 10 that is connected to the engine 2 through the engage portion 6B of the main clutch 6. In parallel with the input shaft 10, the automatic transmission 4 includes an output shaft (counter shaft) 12, a reverse idler shaft 14, and an intermediate shaft (clutch shaft) 16.

Between the input and output shafts 10, 12, change gears 18 defined by the gear trains are provided to transfer driving force of the input shaft 10 to the output shaft 12 at different gear ratios. The change gears 18 are divided into a lower speed gear 18-1, a middle speed gear 18-2, and a higher speed gear 18-3. The lower and higher speed gear 18-1, 18-3 form a first path that directly transmit the torque from the input shaft 10 to the output shaft 12. The first path is defined by a lower speed first path 20-1 toward the lower speed gear 18-1, and a higher speed first path 20-2 toward the higher speed gear 18-3. The middle speed gear 18-2 forms a second path 22 to transmit the torque through an intermediate shaft 16 from the input shaft 10 to the output shaft 12.

The lower speed gear 18-1 directly transmits the rotating torque from the input shaft 10 to the output shaft 12, and is located toward the engine 2, and includes a first gear train 24 and a second gear train 26. The middle speed gear 18-2 transmits the rotating torque through the intermediate shaft 16, and is located between the lower and higher speed gears 18-1, 18-3, and includes a third speed gear train 28. The higher speed gear 18-3 directly transmits the rotating torque from the input shaft 10 to the output shaft 12, and is spaced away from the engine 2, and includes a fourth gear train 30 and a fifth gear train 32.

The first speed gear train 24 includes a first speed drive gear 34 fixed to the input shaft 10, and a first speed driven gear 36 which is disposed rotatably on the output shaft 12 and meshes with the first speed drive gear 34 and has a first speed engaging portion 36A.

The second speed gear train 26 includes a second speed drive gear 38, as a lower speed input gear, fixed to the input shaft 10, and a second speed driven gear 40, as an output gear for the lower speed gear, which is disposed rotatably on the output shaft 12 and meshes with the second speed drive gear 38 and has a second speed engaging portion 40A.

The third speed gear train 28 includes a third speed drive gear 42, as a middle speed input gear, integrated into the second speed driven gear 40 (the output gear for the lower speed gear), a first intermediate gear 44-1 for torque input which is fixed to the intermediate shaft 16 and meshes with the third speed drive gear 42, a second intermediate gear 44-2 for torque output which is rotatable with respect to the input shaft 16, and a third speed driven gear 46, as an output gear for the middle speed gear, which is fixed to the output shaft 12 and meshes with the second intermediate gear 44-2. The first intermediate gear 44-1 is thus driven by the third speed drive gear 42 (input gear for the middle speed gear) integrated into the second speed driven gear 40 (the output gear for the low speed gear).

The fourth speed gear train 30 includes a fourth speed drive gear 48, as an input gear for the higher speed gear, which is disposed rotatably on the input shaft 10 and has a fourth speed engaging portion 48A, and a fourth speed driven gear 50 which meshes with the fourth speed drive gear 48 and is fixed to the output shaft 12.

The fifth speed gear train 32 includes a fifth speed drive gear 52 which is disposed rotatably on the input shaft 10 and has a fifth speed engaging portion 52A, and a fifth speed driven gear 54 which meshes with the fifth speed drive gear 52 and is fixed to the output shaft 12.

A reverse gear train 56 is disposed between the input and output shafts 10 and 12. The reverse gear train 56 includes a reverse drive gear 58 fixed to the input shaft 10, and a reverse idler gear 62 which engages and disengages the reverse drive gear 58 and is disposed axially slidably on the reverse idler shaft 14 and has a reverse sleeve 60.

Between the first and second gear trains 24 and 26, the output shaft 12 includes a 1st/2nd synchronizer 64 to shift the gear trains. The 1st/2nd synchronizer 64 includes a 1st/2nd hub 66 fixed to the output shaft 12, and a 1st/2nd sleeve 68 which moves axially but nonrotatably on the 1st/2nd hub 66 along the output shaft 12 to selectively engage and disengage the first speed engage portion 36A of the first speed driven gear 36 or the second speed engage portion 40A of the second speed driven gear 40. The 1st/2nd synchronizer 64 is automatically controlled during shifting gears. The 1st/2nd sleeve 68 integrates a reverse driven gear 70 to mesh with the reverse idler gear 62.

In addition, between the fourth and fifth gear trains 30 and 32, the input shaft 10 includes a 4th/5th synchronizer 72 to shift the gear trains. The 4th/5th synchronizer 72 includes a 4th/5th hub 74 fixed to the input shaft 10, and a 4th/5th sleeve 76 which moves axially but nonrotatably on the 4th/5th hub 74 along the input shaft 10 to selectively engage and disengage the fourth speed engage portion 48A of the fourth speed drive gear 48 or the fifth speed engage portion 52A of the fifth speed drive gear 52. The 4th/5th synchronizer 72 is automatically controlled during shifting gears.

On the intermediate shaft 16, a sub or secondary clutch 78 is disposed to transmit the driving force through a driving force path from the input shaft 10 to the output shaft 12. The sub clutch 78 is a hydraulic clutch, and is operated by hydraulic pressure for connection and disconnection. The sub clutch 78 includes a plurality of clutch disks 80 fixed to and in parallel with the intermediate shaft 16, a pressure plate 82 to abut and release from the clutch disks 80, and a clutch cover section 84 rotatably mounted to the intermediate shaft 16.

That is, the first path 20 includes, toward the input shaft 10, the fourth speed drive gear 48 (the input gear of the higher speed gear) which can be engaged and disengaged by the 4th/5th sleeve 76, and, toward the output shaft 12, the second speed driven gear 40 which can be engaged and disengaged by the 1st/2nd sleeve 68 and is connected to the second path 22 at a downstream end of the gear 40. This second path 22 includes, on the intermediate shaft 16, the first intermediate gear 44-1 for torque input, the second intermediate gear 44-2 for torque output, and the sub clutch 78.

In addition, in the automatic transmission 4, the gears are changed while the sub clutch 78 is transmitting the driving force from the input shaft 10 to the output shaft 12. The second intermediate gear 44-2 is rotatably supported by the intermediate shaft 12, and is meshed with the third speed driven gear 46 (the output gear of the middle speed gear) on the output shaft 12.

The sub clutch 78 on the intermediate shaft 16 is transversely aligned with the 4th/5th sleeve 76 of the higher speed gear 18-3 (i.e. in direction "X" in FIG. 1). That is, the input shaft 10 and the intermediate shaft 16 are positioned in parallel, and the sub clutch 78 is disposed on the intermediate shaft 16 at a portion thereof so as to transversely face toward the 4th/5th sleeve 76 associated with the input shaft 10. The sub clutch 78 is placed on the output shaft 12 at a portion where the output gear is not disposed.

At an end of the output shaft 12 toward the engine 2 with respect to the first driven gear 36, a differential 88 is connected through a final reduction gear mechanism 86. The final reduction gear mechanism 86 includes a reduction gear 90 fixed to the output shaft 12, and a ring gear 92 in mesh with the gear 90. The differential 88 includes a case section 94 having the ring gear 92 fixed thereto, and a pinion gear section 96 connected to the case section 94. The pinion gear section 96 is connected to left and right drive shafts 98, 98 to which left and right vehicle drive wheels (not shown) are attached. Thereby, the output shaft 12 is connected to the drive wheels through the final reduction mechanism 86, the differential 88, and the drive shafts 98, 98.

Separate actuators (not shown) operate the main clutch 6, the reverse sleeve 60, the 1st/2nd sleeve 68, the 4th/5th sleeve 76, and the sub clutch 78.

The operation of the above embodiment will now be described.

During operation in, e.g., third speed and as the sub clutch 78 is engaged, the acceleration torque input from the main clutch 6 is transmitted to the output shaft 12 through the second-speed drive gear 38, the second speed driven gear 40, the third speed drive gear 42, the first intermediate gear 44-1, the intermediate shaft 16, the clutch cover section 84, the second intermediate gear 44-2, and the third speed driven gear 46 to rotate the output shaft 12.

As described above, in the first embodiment, the change gear 18 defines the first path 20-1 and 20-2 that directly transmit the torque from the input shaft 10 to the output shaft 12, and the second path 22 that transmits the torque through the intermediate shaft 16 on a driving force path from the input shaft 10 to the output shaft 12. In the first path 20-1, the second speed driven gear 40, which is at least one of the output gears, on the output shaft 12 can be engaged and disengaged by the 1st/2nd sleeve 68. The second path 22 is connected to a downstream end of the second speed driven gear 40. The second path 22 includes, on the intermediate shaft 16, the first intermediate gear 44-1 to input the torque, the sub clutch 78, and the intermediate gear 44-2 to output torque rotatably supported through the sub clutch 78. The output shaft 12 includes the third speed driven gear 46 to mesh with the second speed intermediate gear 44-2, thereby forming the middle speed gear 18-2. That is, the third speed gear train 28 or the middle speed gear 18-2 is formed by the third speed drive gear 42 integrated into the second speed driven gear 40, the first intermediate gear 44-1 fixed to the intermediate shaft 16 in mesh with the third speed drive gear 42, the sub clutch 78, the second speed intermediate gear 44-2 fixed to the clutch cover section 84, and the third speed driven gear 46 fixed to the output shaft 12 in mesh with the second intermediate gear 44-2. Due to this formation, the middle speed gear train also serves as a gear train to drive the intermediate shaft 16 having the sub clutch 78. Accordingly, this shortens the length "L1" of the automatic transmission 4 by the thicknesses (as measured axially along the shafts 10, 12) of a drive gear dedicated to drive the intermediate shaft 16 and of the sub clutch 78 so as to miniaturize the automatic transmission 4. The interference with a vehicle frame (not shown) can be eliminated when the engine and the automatic transmission are mounted to the FF (front engine, front drive) vehicle or are mounted transversely relative to the vehicle.

In addition, the sub clutch 78 is radially aligned with the 4th/5th sleeve along the axial directions of the shafts so that the clutch is positioned between the output gears 50, 54 of the higher speed gear 18-3 (at a portion facing the 4th/5th sleeve 76 of the higher speed gear 18-3). That is, the sub clutch 78 is compactly positioned at a portion where no output gear is disposed.

Furthermore, the first intermediate gear 44-1 is driven by the third speed drive gear 42 which is integrated into the second speed driven gear 40 as an output gear, which improves the degree of flexibility in selection of gear ratio of the gear train forming the middle speed 18-2.

Figure 2:
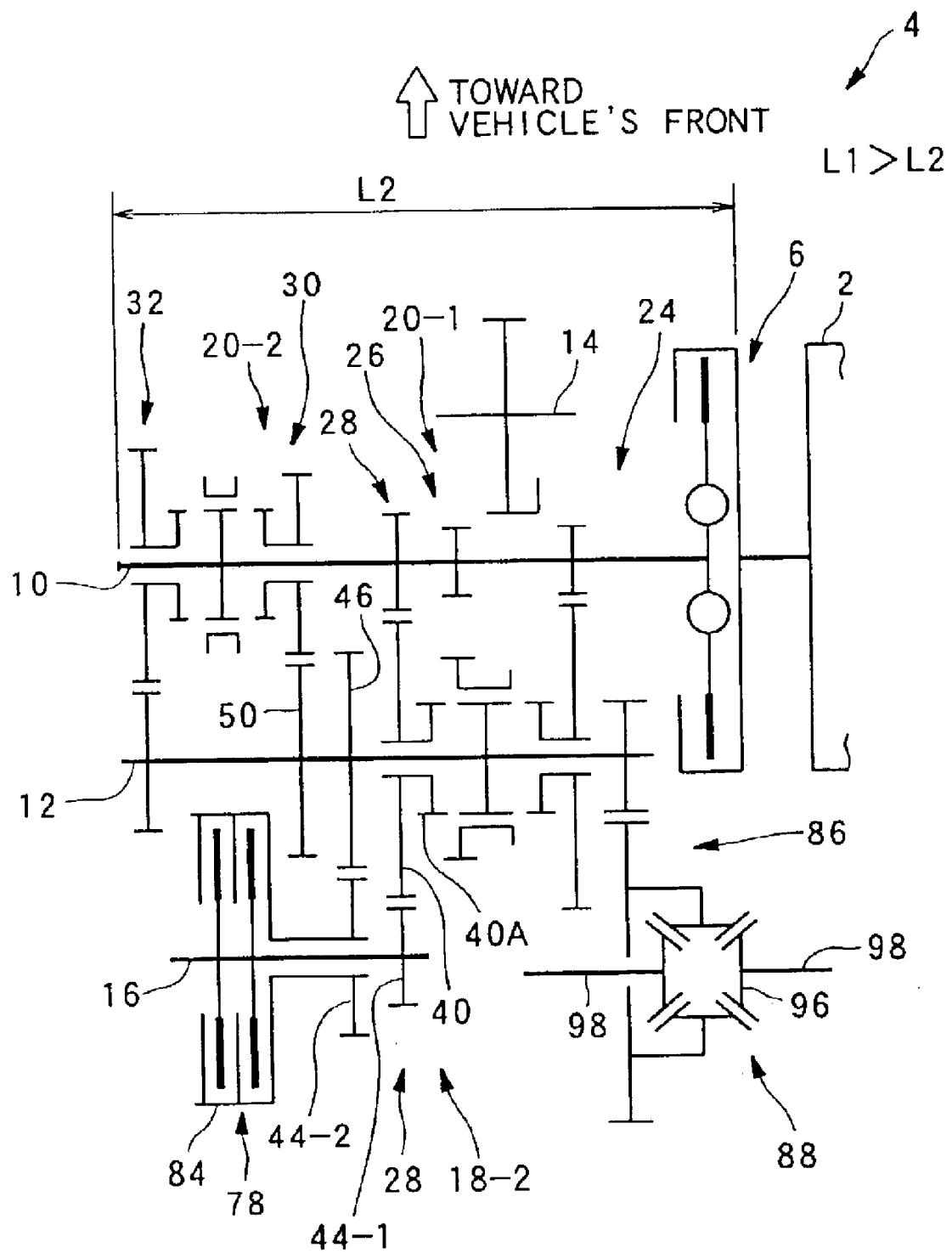
FIG. 2 is a diagram illustrating an automatic transmission according to a second embodiment.

FIG. 2 shows a second embodiment of the present invention and is described below.

The same reference numerals are hereinafter utilized for features which are substantially identical in function to those described above relative to the embodiment of FIG. 1.

This second embodiment is characterized in that the first intermediate gear 44-1 is directly driven by the second speed driven gear 40. More particularly, in this embodiment, the first intermediate gear 44-1 directly meshes with the second speed driven gear 40 instead of the third speed drive gear 42, i.e. middle speed input gear, which latter gear is eliminated in this FIG. 2 embodiment.

According to the second embodiment (FIG. 2), overall length "L2" of the automatic transmission 4 can be compactly shorten by the axial thickness of the third speed drive gear 42 as compared to the overall length "L1" of the automatic transmission 4 in the first embodiment (FIG. 1). The third speed gear train 28 of FIG. 2 only utilizes three components, i.e., the first intermediate gear 44-1, the second intermediate gear 44-2, and the third speed driven gear 46, thereby reducing the number of the components to achieve cost reduction.

Figure 3:
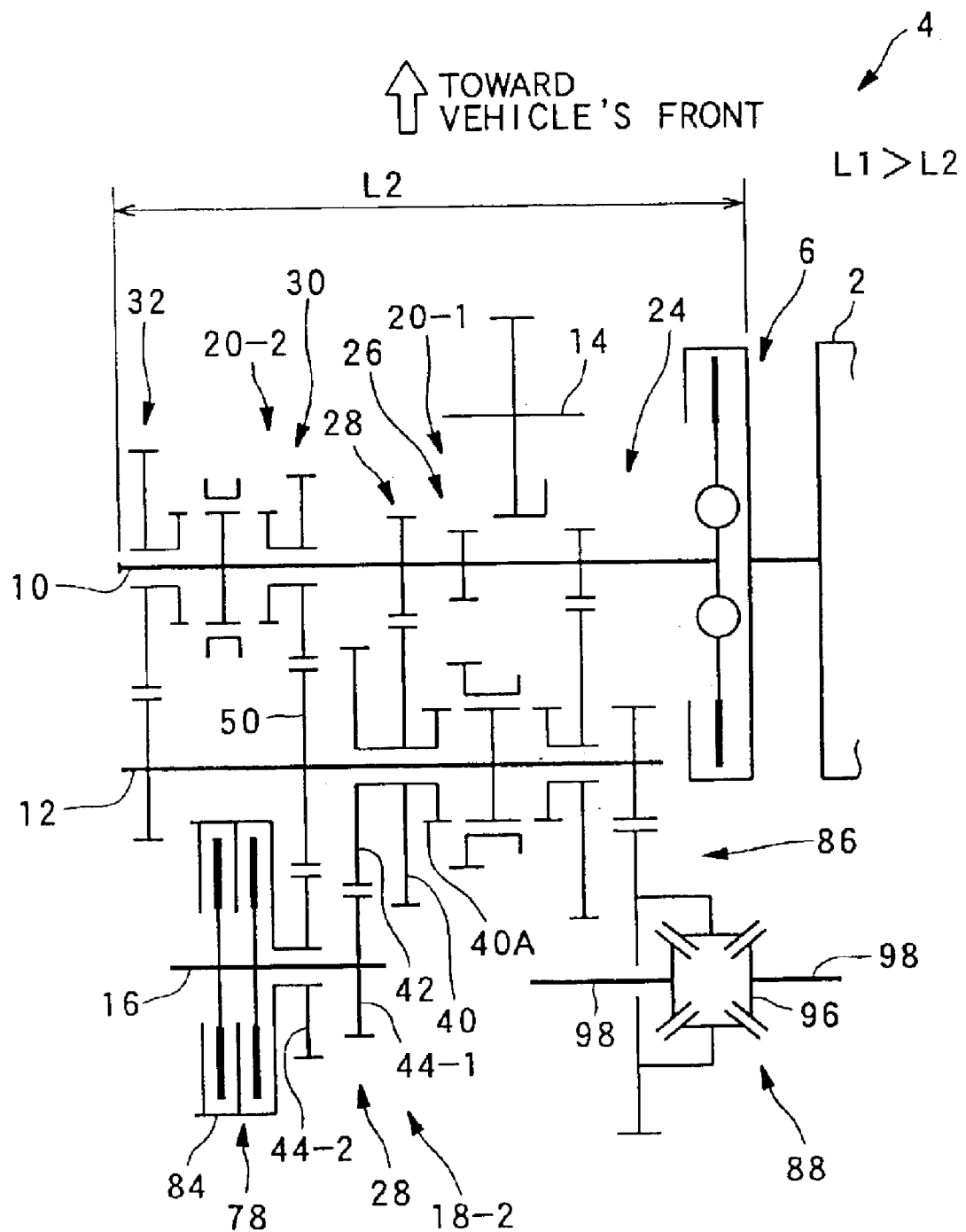
FIG. 3 is a diagram illustrating an automatic transmission according to a third embodiment.

FIG. 3 shows a third embodiment of the present invention.

This third embodiment is characterized in that the second path 20-2 does not have the third speed driven gear 46, i.e. the middle speed output gear, but rather has the second intermediate gear 44-2 directly meshing with the fourth speed driven gear 50 (higher speed output gear).

According to this third embodiment, the third speed driven gear 46, i.e., the middle speed output gear is eliminated. The fourth speed driven gear 50, i.e., the higher speed output gear, is employed commonly, so that the automatic transmission has the same length "L2" as that of the second embodiment (FIG. 2), thereby reducing the number of components and the weight.

Figure 4:
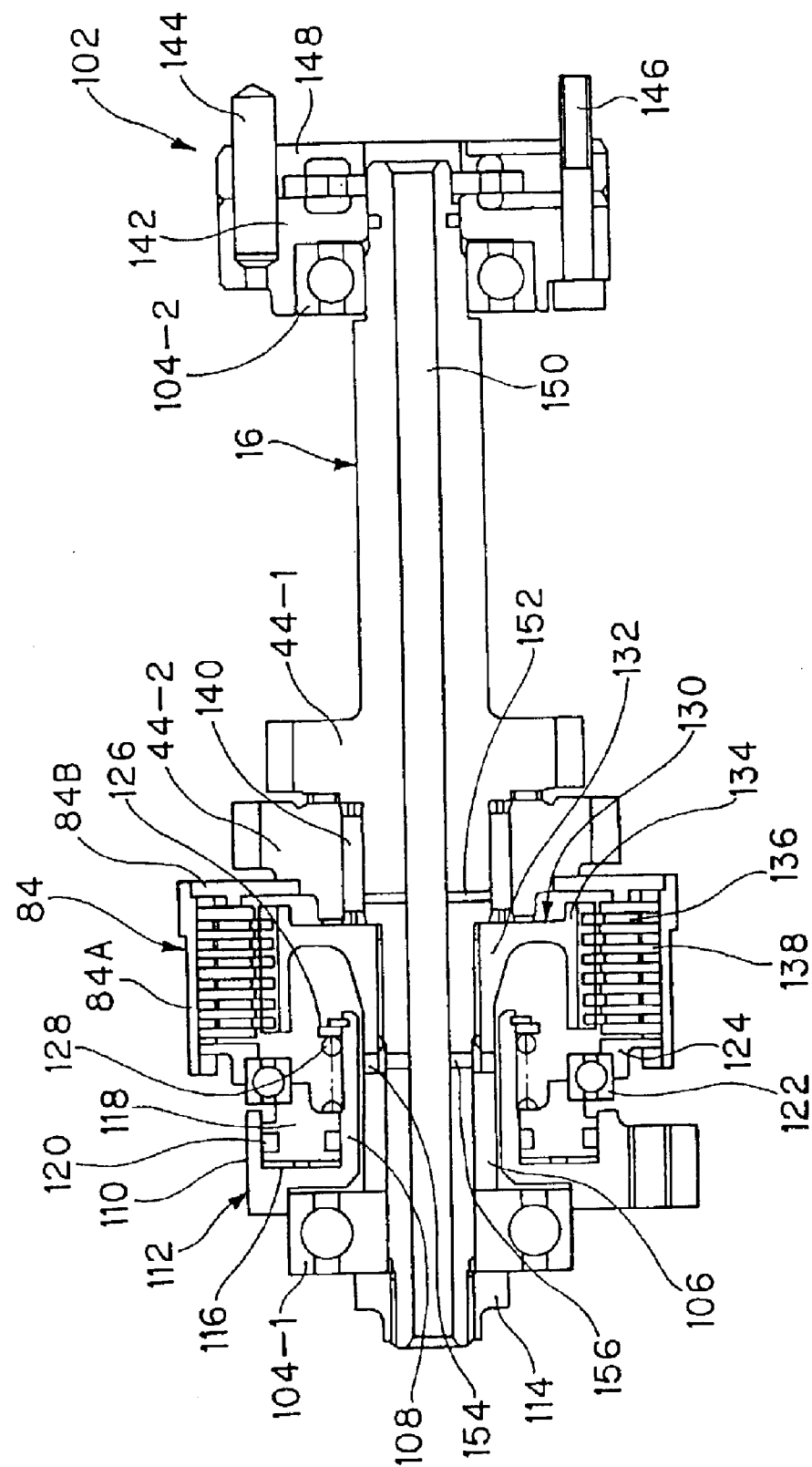
FIG. 4 is an enlarged cross-sectional view illustrating an intermediate shaft having a sub clutch and a cooling oil pump according to the first, second and third embodiments.

Additionally, in the first, second and third embodiments the intermediate shaft 16 has at one end the sub clutch 78 and at the other end the cooling oil pump 102 as shown in FIG. 4.

That is, the intermediate shaft 16 is supported at both ends by bearings 104-1, 104-2.

In the sub clutch 78, the intermediate shaft 16 has a supporting tube 106 of a sleeve form fitted thereto toward the bearing 104-1. The sub clutch 78 includes a cylinder 112 which has inner and outer sliding sections 108 and 110, with the inner sliding section abutting both the supporting tube 106 and the bearing 104-1, and having a C-shaped cross section extending axially of the intermediate shaft 16. The supporting tube 106 contacts at one end with an inner side of the bearing 104-1 which contacts at an outer end with a fixing nut 114 attached thereto from one end of the intermediate shaft 16.

Between the inner and outer sliding section 108, 110 of the cylinder 112, an axially slidable piston 118 is disposed to define an oil pressure chamber 116. The piston 118 has a sealing material 120 in contact with an inner side of the outer sliding section 110, and has a communication bearing 122 connected at an end thereof. The communication bearing 112 is connected to the pressure plate 124. In an outer circumferential section of the inner sliding section 108 of the cylinder 112, a spring stop portion 126 is disposed. Between the spring stop portion 126 and the piston 118, a spring 128 is inserted to push the piston 118 in a direction which the oil pressure chamber 116 has less volume.

The intermediate shaft 16 has a base 132 of a disk supporting member 130 attached thereto in a spline to align with the supporting tube 106 and to face the cylinder 112. In an outer circumferential section 134 of the disk supporting member 130, a plurality of first disks 136 are positioned in a line. In an outer circumferential section 84A of the clutch cover section 84, a plurality of second disks 138 are positioned alternately with the first disks 136. The first and second disks 136, 138 are disposed between the pressure plate 124 and a side member 84B of the clutch cover section 84. The pressure plate 124 and the side member 84B of the clutch cover section 84 are fixed to the second intermediate gear 44-2 which is rotatably mounted to the intermediate shaft 16 through a roll bearing 140. The intermediate shaft 16 has the first intermediate gear 44-2 integrated thereinto in alignment with the second intermediate gear 44-2.

Also, the intermediate shaft 16 is equipped at the other end thereof with the cooling oil pump 102. The cooling oil pump 102 includes a first pump cover 142 in contact with the bearing 104-2, and a pump plate 148 mounted to the pump cover 142 by a positioning pin 144 and a mounting bolt 146.

Furthermore, a cooling oil groove 150 extends axially along the center of the intermediate shaft 16. The intermediate shaft 16 also has a first oil passage 152 defined therein to communicate with the cooling oil groove 150 and radially extending to the roll bearing 140, and has a second oil passage 156 communicated with the cooling oil groove 150 and radially extending to a gap 154 between the supporting tube 106 and the disk supporting member 130. The cooling oil pump 102 thus can be easily positioned at one end of the intermediate shaft 16 opposing to the sub clutch 78 at the other end of the shaft 16.

Figure 5:
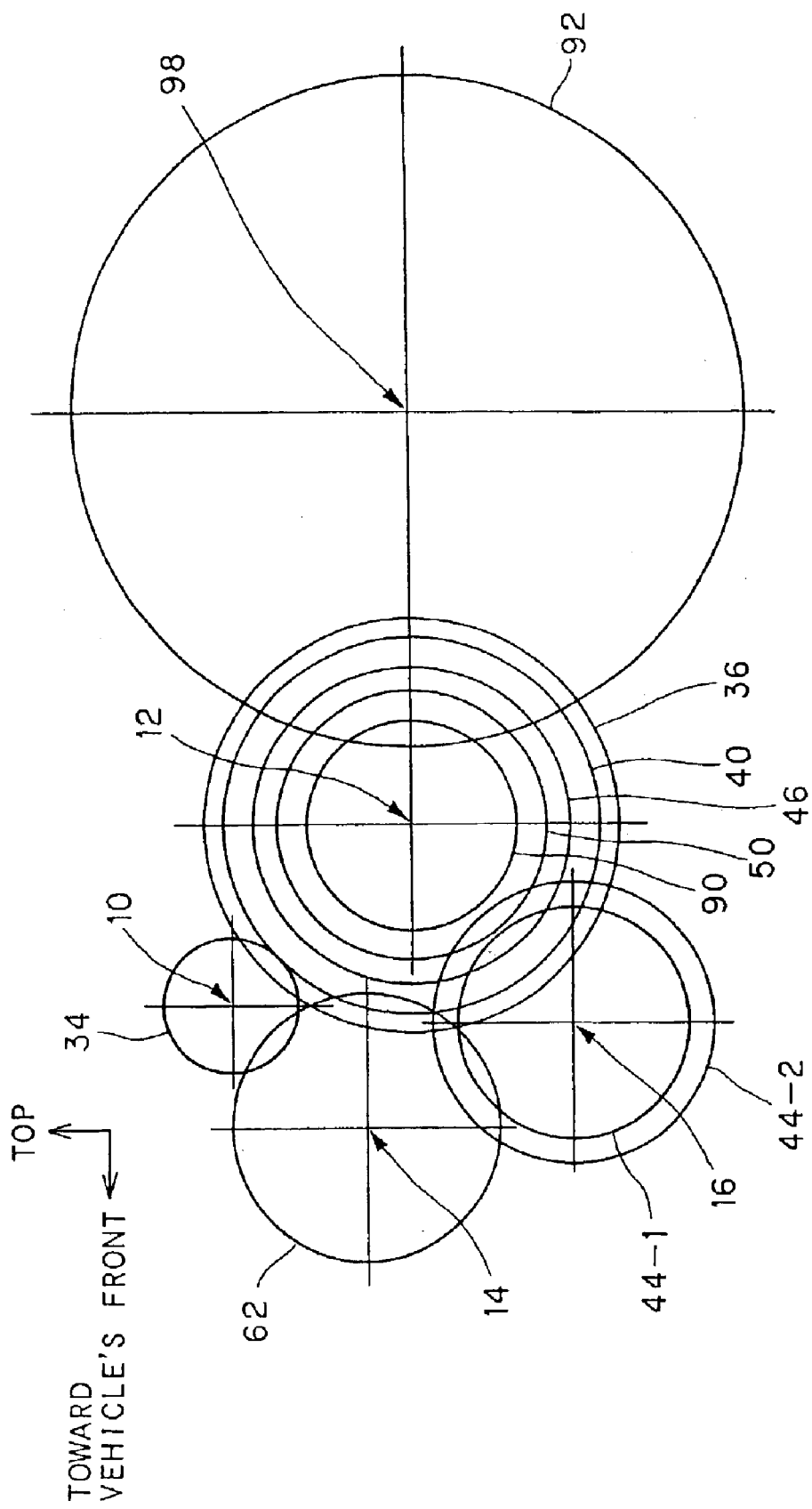
FIG. 5 is a diagram illustrating a relation among shafts according to the first, second and third embodiments.

FIG. 5 shows the positioning relations among the input shaft 10, the output shaft 12, the reverse idler shaft 14, and the intermediate shaft 16, which shafts extend transversely of the vehicle. The reverse idler shaft 14 is positioned toward the front of the vehicle. The output shaft 12 is positioned toward the rear of the vehicle but a little lower than the idler shaft 14. The input shaft 10 is positioned above and between the reverse idler shaft 14 and the output shaft 12. The intermediate shaft 16 is positioned below and between the reverse idler shaft 14 and the output shaft 12. That is, the intermediate shaft 16 is disposed at the lowest position of the shafts. The drive shaft 98 is positioned at the same height as that of the output shaft 12.

Accordingly, the intermediate shaft continuously driven by the input shaft 10 is provided at one end with the sub clutch 78 and at the other end with the cooling oil pump 102. Forming, in the intermediate shaft 16, the cooling oil groove 150 which connects the cooling oil pump 102 with the sub clutch 78 not only eliminates additional gears to drive cooling oil pump 102 and additional components such as chains, but also drives the cooling oil pump 102 and provides the cooling oil to the sub clutch 78. This reduces the number of the components and shortens the cooling oil passage 150 to decrease loss of driving force.

In addition, positioning of the intermediate shaft 16 below the input and output shafts 10, 12 shortens the oil passage extending from an oil storage section to the cooling oil pump 102 in the automatic transmission 4 so as to improve suction of the cooling oil.

Figure 6:
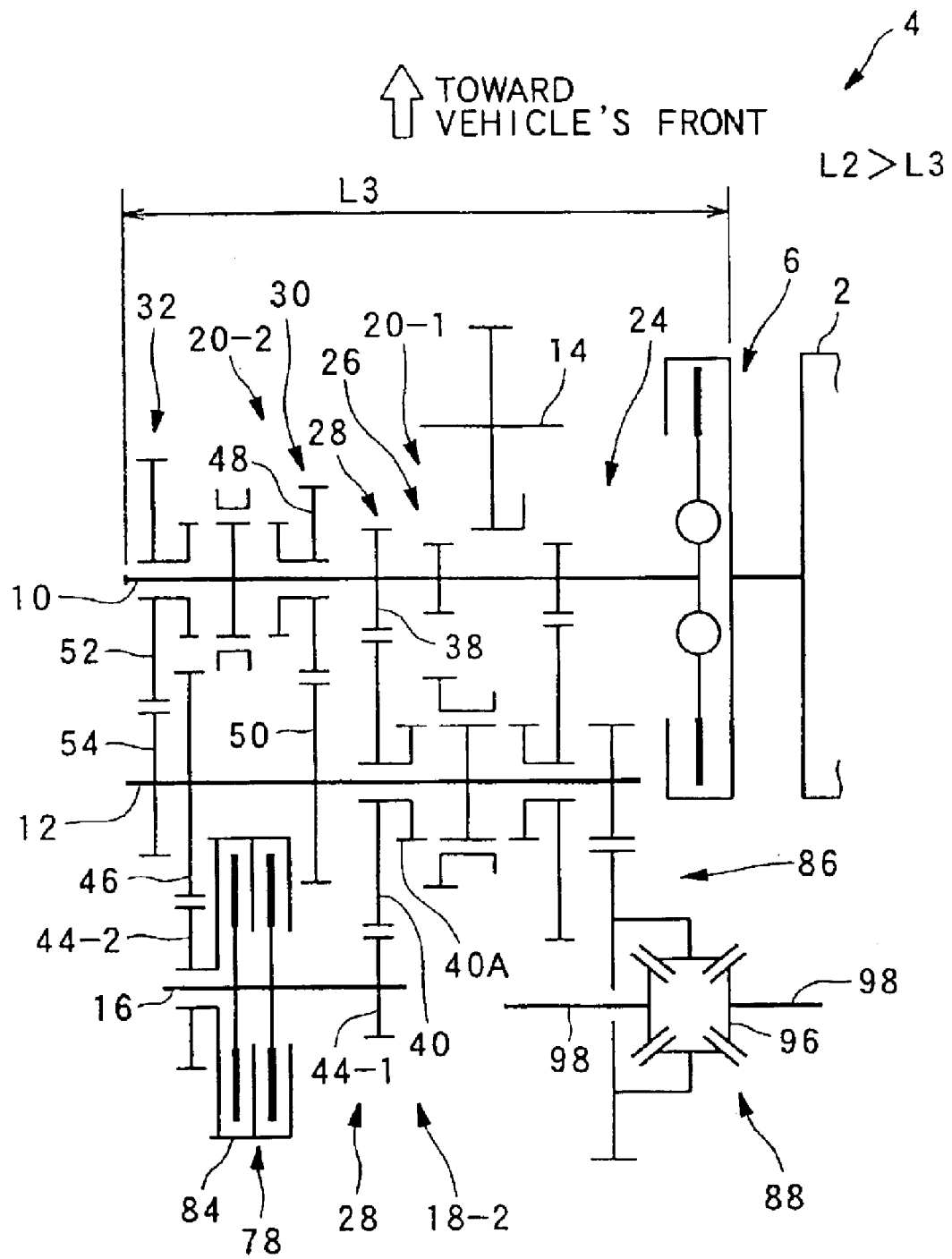
FIG. 6 is a diagram illustrating an automatic transmission according to a fourth embodiment.

FIG. 6 shows a fourth embodiment as a special constitution of the present invention.

This fourth embodiment is a variation of the constitution of the second embodiment (FIG. 2) wherein the output shaft 12 has the third speed driven gear 46 adjacent to the fifth speed driven gear 54, and the second intermediate gear 44-2 in mesh with the third speed driven gear 46 is fixed to the clutch cover section 84 of the sub clutch 78 toward the other end of the intermediate shaft 16. According to this fourth embodiment (FIG. 6), however, the third speed driven gear 46 is not disposed between the second and fourth driven gears 40 and 50 on the output shaft 12, so that smaller gaps are produced between the second and fourth drive gears 38 and 48 on the input shaft 10 and between the second and fourth speed driven gears 40 and 50 on the output shaft 12. The automatic transmission 4 is shortened by the smaller gaps so as to constitute an automatic transmission 4 of less overall length "L3" so as to improve mounting thereof on the vehicle.

Figure 7:
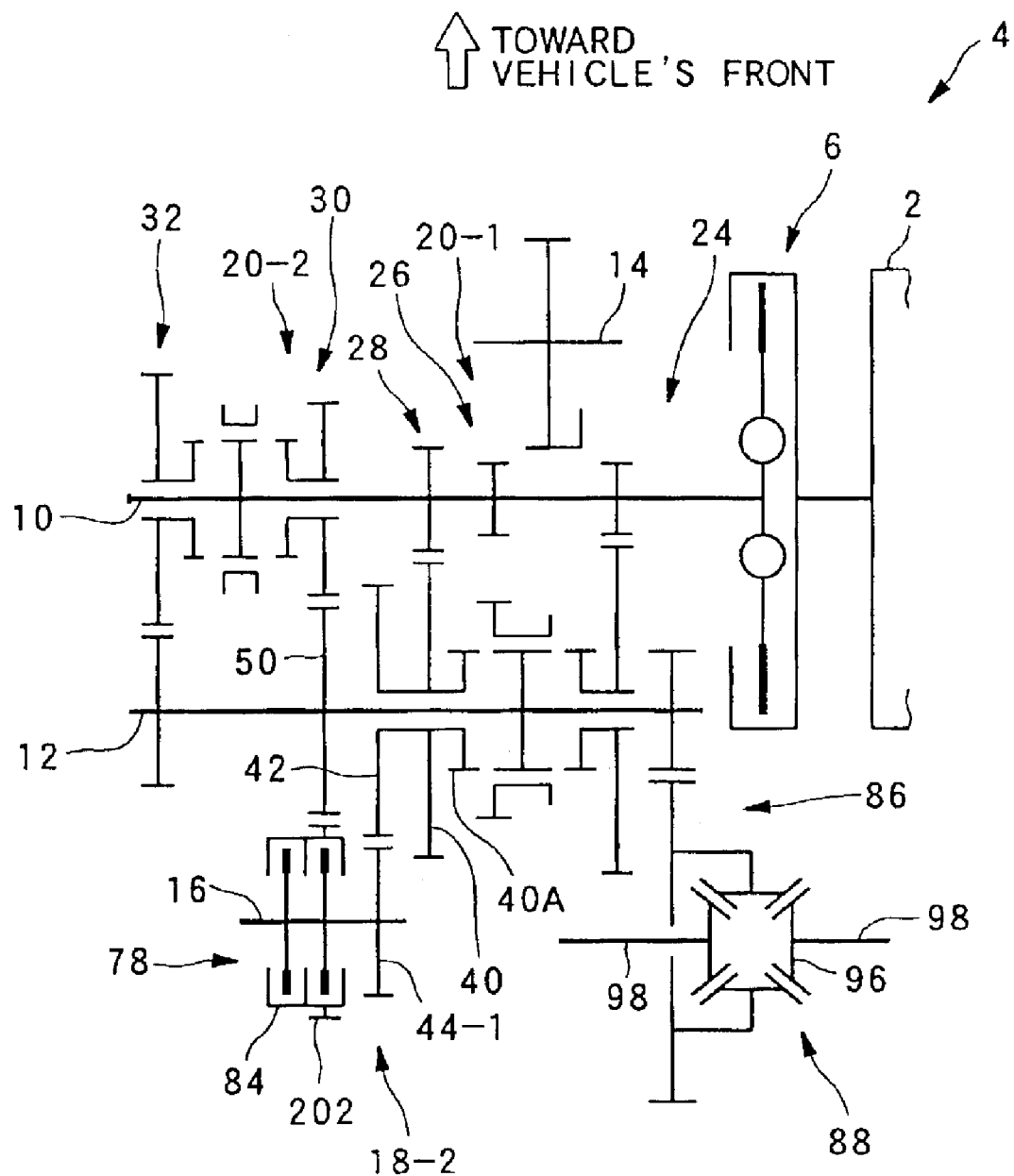
FIG. 7 is a diagram illustrating an automatic transmission according to a fifth embodiment.

FIG. 7 shows a fifth embodiment as a special constitution of the present invention.

The fifth embodiment is a variation of the constitution of the third embodiment (FIG. 3), wherein the sub clutch 78 is provided, and the second intermediate gear 44-2 is in mesh with the fourth driven gear 50.

According to this fifth embodiment (FIG. 7), the sub clutch 78 is made smaller in diameter and a ring gear 202 is employed instead of the second intermediate gear 44-2. The ring gear 202 is directly fixed to and around an outer circumference of the clutch cover section 84 so that periphery of the sub clutch 78 is made more compactly to miniaturize the overall size of the automatic transmission 4.

As thus described, in the automatic transmission according to the present invention, the change gears include the first path to directly transmit torque of the input shaft to the output shaft, and the second path to transmit the torque through an intermediate shaft on the driving force path from the input shaft to the output shaft. The first path includes at least one output gear on the output shaft which is engageable and disengageable by the shift sleeve. The output gear is connected at downstream thereof to the second path. The second path includes the first intermediate gear on the intermediate shaft to input the torque, the clutch, and the second intermediate gear rotatably supported through the clutch to output the torque. The output shaft includes the middle speed output gear to mesh with the second intermediate gear so as to form the middle-speed change gear. As a result, the intermediate shaft is driven by the middle speed gear train. The overall length of the automatic transmission can be reduced by the axial thickness of both the drive gear dedicated to drive the intermediate shaft and the clutch, so that the automatic transmission can be reduced in size (i.e. length). The interference with the vehicle frame can be eliminated or minimized when the engine and the automatic transmission are mounted to a FF (front engine, front drive) vehicle or are mounted transversely in the vehicle.

Although particular preferred embodiments of the invention have been disclosed in detail for illustrative purposes, it will be recognized that variations or modifications of the disclosed apparatus, including the rearrangement of parts, lie within the scope of the present invention.

What is claimed is:

1. An automatic transmission, comprising:

change gears including a plurality of gear trains between input and output shafts;

a clutch to transmit driving force between said input and output shafts, said gear trains being shifted while said clutch is transmitting the driving force of said input shaft to said output shaft;

said change gears including a direct path to directly transmit torque of said input shaft to said output shaft, and intermediate driving force path to transmit torque through an intermediate shaft from said input shaft to said output shaft;

said direct path including at least one output gear on said output shaft and being engageable and disengageable by a shift sleeve, said output gear fixed to a middle-speed input gear that is rotatable therewith;

said intermediate driving force path including a first intermediate gear driven by said middle-speed input gear and secured to said intermediate shaft to input the torque, wherein said clutch, and a second intermediate gear rotatably supported through said clutch output the torque; and said output shaft including a middle speed output gear to mesh with said second intermediate gear so as to form a middle-speed change gear.

2. The automatic transmission defined in claim 1, wherein said intermediate shaft has said clutch at one end thereof, and an oil pump at the other end thereof, and said intermediate shaft includes an oil groove formed therein to communicate said clutch with said oil pump.

3. An automatic transmission, comprising:

an input shaft, an output shaft and an intermediate shaft in generally parallel relationship;

change speed gears including a plurality of gear trains connectable between said input and output shafts for providing a plurality of speed ratios;

a clutch to transmit torque between said input and output shafts, said clutch transmitting the driving torque of said input shaft to said output shaft while said gear trains are being shifted;

a first said gear train providing a first low output speed and including a first input gear nonrotatably fixed to the input shaft and disposed in meshing engagement with a first output gear which rotatably surrounds the output shaft;

a second gear train providing a second speed which is greater than said first speed and including a second input gear nonrotatably fixed to the input shaft and disposed in meshing engagement with a second output gear which rotatably surrounds the output shaft;

a first shifter nonrotatably associated with the output shaft and shiftable axially thereof for selective engagement with either of said first and second output gears;

a third said gear train for transmitting torque from said second output gear to said output shaft at a third output speed which is greater than said second speed, said third gear train including 1) a first intermediate gear nonrotatably secured to said intermediate shaft and driven by a further gear coaxially fixed to said second output gear, 2) a second intermediate gear rotatably surrounding said intermediate shaft and disposed for driving said output shaft, and 3, a clutch coaxially aligned with and supported on said intermediate shaft and having a first part connected to and driven by said intermediate shaft and a second part connected to and effecting driving of said second intermediate gear;

a fourth said gear train having a fourth input gear which rotatably surrounds the input shaft and is in meshing engagement with a fourth output gear which is fixed to the output shaft for defining a fourth output speed which is greater than said third speed;

a fifth said gear train having a fifth input gear which rotatably surrounds the input shaft and is in meshing engagement with a fifth output gear which is fixed to the output shaft for defining a fifth speed which is greater than said fourth speed; and a second shifter which is nonrotatably fixed to and axially shiftable relative to said input shaft for being selectively engageable with either of said fourth and fifth input gears.

4. An automatic transmission, comprising:

an input shaft;

an output shaft;

change gears including a plurality of gear trains between said input and output shafts, said change gears including a direct path to directly transmit torque of said input shaft to said output shaft;

an intermediate shaft having an oil groove formed therein;

a clutch provided at a first end of the intermediate shaft to transmit driving force between said input shaft and said output shaft through said intermediate shaft, said gear trains being shifted while said clutch is transmitting the driving force of said input shaft to said output shaft;

an oil pump disposed at a second end of said intermediate shaft for providing oil through said groove to said clutch;

said change gears including at least one output gear rotatably supported on said output shaft and engaged or disengaged by a shift sleeve, said output gear meshing with a first intermediate gear to input the torque to the intermediate shaft;

a second intermediate gear on the intermediate shaft;

a second output gear nonrotatably fixed to the output shaft that meshes with said second intermediate gear, wherein said clutch and said second intermediate gear transfer the torque from said first intermediate gear to said output shaft, and wherein locating said oil pump on the intermediate shaft enables a reduction in length of said transmission in the axial direction of the input shaft.

* * * * *